United States Patent [19] [11] Patent Number: 5,781,668
Starkweather [45] Date of Patent: Jul. 14, 1998

[54] METHOD AND APPARATUS FOR IMPROVED IMAGE GENERATION USING SCANNING DEVICES

[75] Inventor: Gary K. Starkweather, Saratoga, Calif.

[73] Assignee: Apple Computer, Inc., Cupertino, Calif.

[21] Appl. No.: 469,758

[22] Filed: Jun. 6, 1995

Related U.S. Application Data

[63] Continuation of Ser. No. 955,560, Oct. 1, 1992, abandoned.

[51] Int. Cl.$^6$ .................................................. G06K 9/00
[52] U.S. Cl. ............................................. 382/318; 382/270
[58] Field of Search .............................. 382/270, 318, 382/319, 254, 276, 271, 272, 273, 113, 128, 129, 130, 131, 132, 137, 138, 162, 163, 164, 167, 173, 180, 224, 260, 274, 275, 282, 283, 284, 293, 299, 300, 305, 306, 307, 308, 309, 312, 321, 322, 323, 324; 348/221, 222, 362

[56] References Cited

U.S. PATENT DOCUMENTS 4,251,837 2/1981 Janeway, III ....................... 382/270
4,750,041 6/1988 Vogel et al. ......................... 348/221
5,144,442 9/1992 Ginosar ............................... 358/909

*Primary Examiner*—Leo H. Boudreau
*Assistant Examiner*—Bijan Tadayon
*Attorney, Agent, or Firm*—Blakely, Sokoloff, Taylor & Zafman

[57] ABSTRACT

A method and apparatus for improving the quality of images captured by inexpensive scanning devices is described. After an initial scan of the image to be captured is performed, at least two additional scans are performed, one at an exposure level much greater than that used in the first scan and one at an exposure level much lower than that used in the first scan. After all three scans are complete, a composite stored image is formed using the gray scale values generated by the overexposed scan for darker areas of the image, the gray scale level generated by the underexposed scan for the lighter portions of the image, and, for those areas between the extremes, using the gray scale levels produced by the first scan. An apparatus is also described for performing these scans and selecting and combining the requisite data.

18 Claims, 4 Drawing Sheets

METHOD AND APPARATUS FOR IMPROVED IMAGE GENERATION USING SCANNING DEVICES

This is a continuation of application Ser. No. 07/955,560, filed Oct. 1, 1992, now abandoned.

BACKGROUND OF THE INVENTION

This invention is in the field of digital image processing. In particular, it is a method and apparatus for improving the performance of low-cost scanning devices.

Various devices exist which are capable of scanning either a printed document or image and converting the image or document into a digital representation which can then be manipulated by a computer. These devices include optical character readers ("OCR"s) and various image scanners that scan transparent and/or reflective originals. For simplicity, the document being scanned will always be referred to as a picture in this description. This is done to facilitate explanation of this invention and in no way limits the present invention.

Although the more expensive of these devices have a data path of at least 8-bits, which allows up to 256 gray scale levels, allowing the stored image to be recreated with adequate contrast and detail, an entire family of low-cost, hand-held scanners is now available which has a data path of only 4-bits, which allows only 16 gray scale levels. Although their cost makes these hand-held scanners attractive to users, their imaging performance leaves a great deal to be desired. A method and/or an apparatus which can improve the performance of these scanners without significantly adding to their cost or simplicity of use would be very desirable.

SUMMARY OF THE INVENTION

The present invention, in a first preferred embodiment, comprises a method for using a low-cost scanner which method greatly improves the quality of the captured picture and its subsequent reproduction. In this method, the picture is scanned three different times. During the first scan, the picture is exposed at a standard "average" light level. During the second scan, the picture is exposed at a light level at least twice as high as that used in the original, first scan. Finally, during the third scan, the picture is exposed at a light level at least 2 times less than that used in the first scan. The digital output from these three different scans is then combined in such a way that the stored image has effectively many more gray levels than the 16 which it is nominally capable of generating. The order of scanning the average, overexposed, and underexposed images is not critical to the present invention.

Although the scanning device does not need to be physically modified for use with this invention, in another preferred embodiment of the present invention a software routine is stored in the computer to which the scanning device is attached which routine adjusts the exposure levels automatically. In both preferred embodiments, the data from each scan is manipulated by the computer system to which the scanner is attached so that it properly contributes to the final stored image.

The present invention will now be described in detail, with reference to the figures listed and described below.

DETAILED DESCRIPTION OF THE PREFERRED EMBODIMENTS

Figure 1:
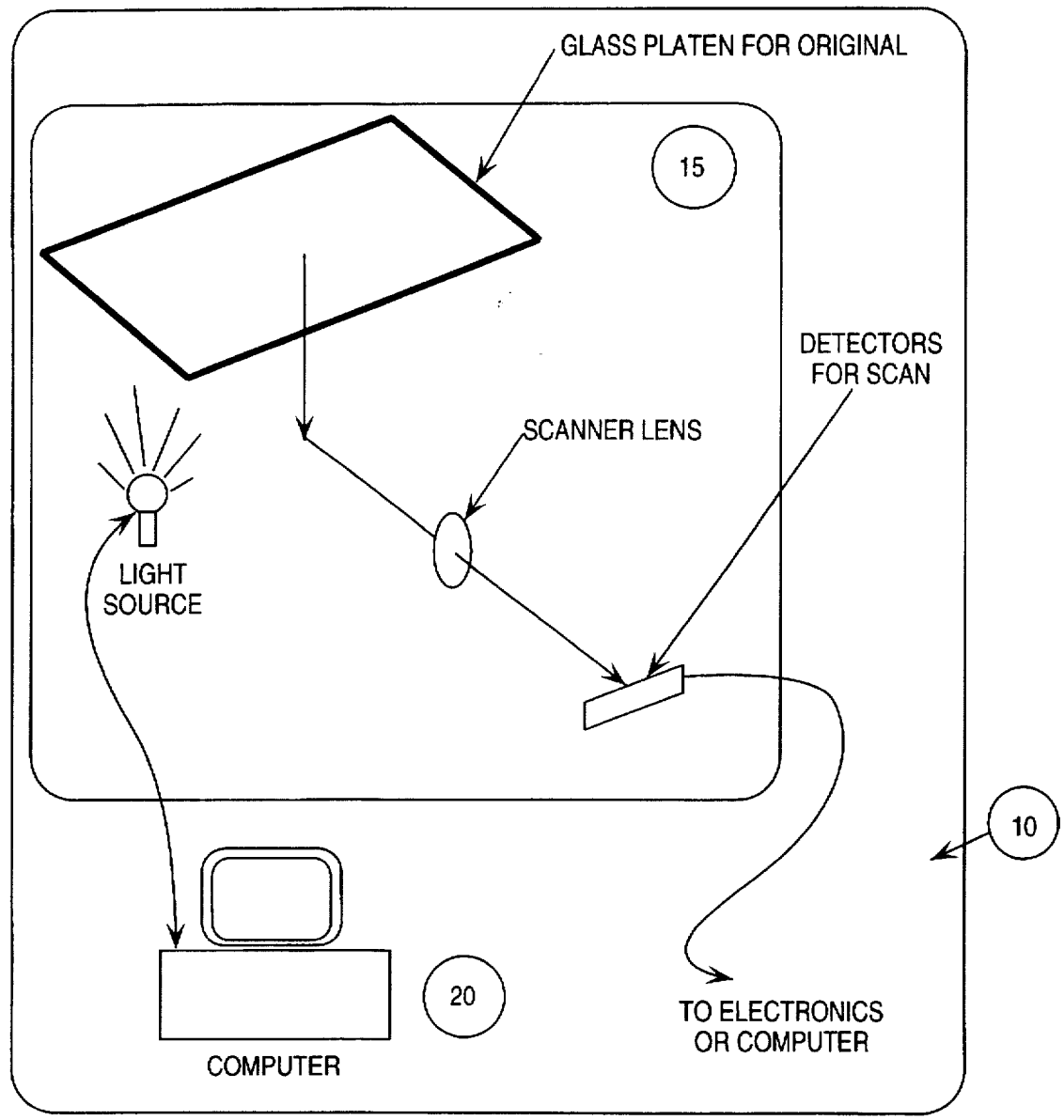
FIG. 1 shows an image scanning system incorporating the present invention.

The first preferred embodiment of the present invention operates within the system shown in FIG. 1. System 10 is comprised of digital image scanner 15, which in this embodiment has a 4-bit serial output, and computer 20 which can be any type of computer. In a preferred embodiment of this invention the computer will be a known personal computer.

The known method for using the system illustrated in FIG. 1 is to scan a picture once, thereby converting it into a serial binary data stream which can be stored in computer 20. Sometimes multiple passes of the picture are necessary, as when the scan width of the scanner is less than the width of the picture.

Figure 2:
FIG. 2 shows an image reproduced from the data captured by a scanner having a 4-bit data channel.

As shown in FIG. 2, the scanner used in system 10 is not capable of capturing the picture without a significant reduction of the picture's contrast levels. This is a result of the narrow bandwidth of scanner 15, which generates only a 3-bit serial output. As 3-bit can only reproduce up to 8 gray levels, there is an unsatisfactory loss of detail and contrast in the captured image.

In the present invention's first embodiment, three separate scans of each picture to be stored are made. Also, if multiple scans were necessary to capture the entire original document, then each of the multiple scans will need to be repeated three times.

Figure 3:
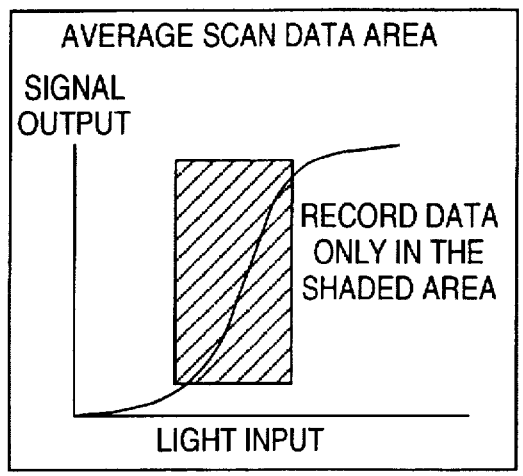
FIG. 3 is a graphic representation of the data collected by the first, average scan used in the present invention.

The first scan is performed as in the known art, with no alteration of procedure. The digital data captured by such a scan is illustrated in FIG. 3. It should be noted that the various values representing different gray levels are distributed somewhat evenly over the range of possible values.

Figure 4:
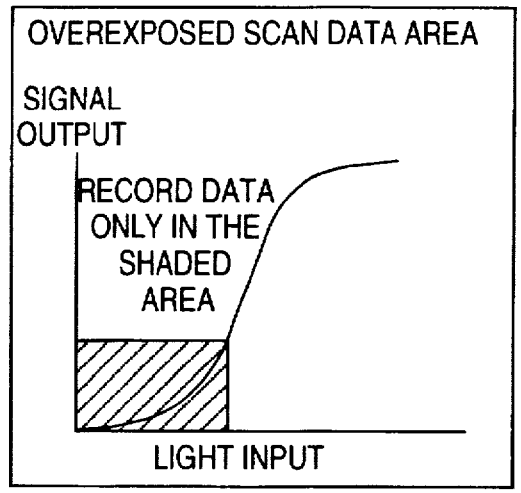
FIG. 4 is a graphic representation of the data collected by the second, overexposed scan used in the present invention.

For the second scan, the light intensity used during the scanning process is increased to a level at least two times greater than that used for the first scan. In the preferred embodiment, this increase in exposure level is programmed into computer 20, which indicates to the operator when to begin the second scan or automatically operates the scanner and also automatically increases the scanner's exposure level. The data captured by this overexposed scan is graphically represented in FIG. 4. As can be seen in the figure, overexposing the document during a scan effectively "whites-out" the lighter portions of the document. As these lighter portions of the document will all receive the same gray scale value, either the maximum or minimum, depending upon the system, the remaining, darker portions of the image will be assigned the remaining gray scale values. This effectively increases the detail captured from the darker portions of the image as the same number of gray scale levels is distributed over a smaller area of the picture.

Figure 5:
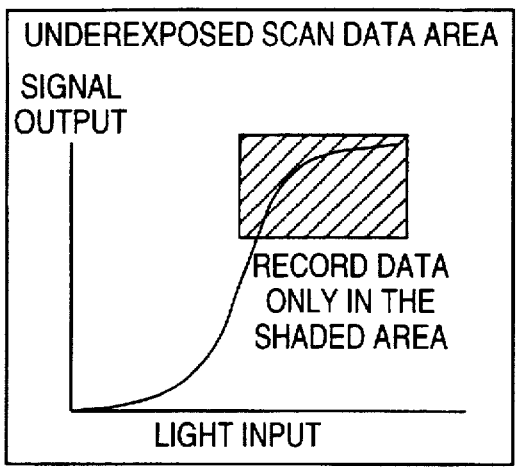
FIG. 5 is a graphic representation of the data collected by the third, underexposed scan used in the present invention.

In the third scan, the process described for the second scan is repeated, with the sole change that the exposure level in this scan is decreased at least two levels below that used in the first scan. This underexposed scan blacks-out the darker portions of the image and results in more contrast details from the lighter portions of the image being captured and stored. The data captured by this scan is shown graphically in FIG. 5.

Figure 6:
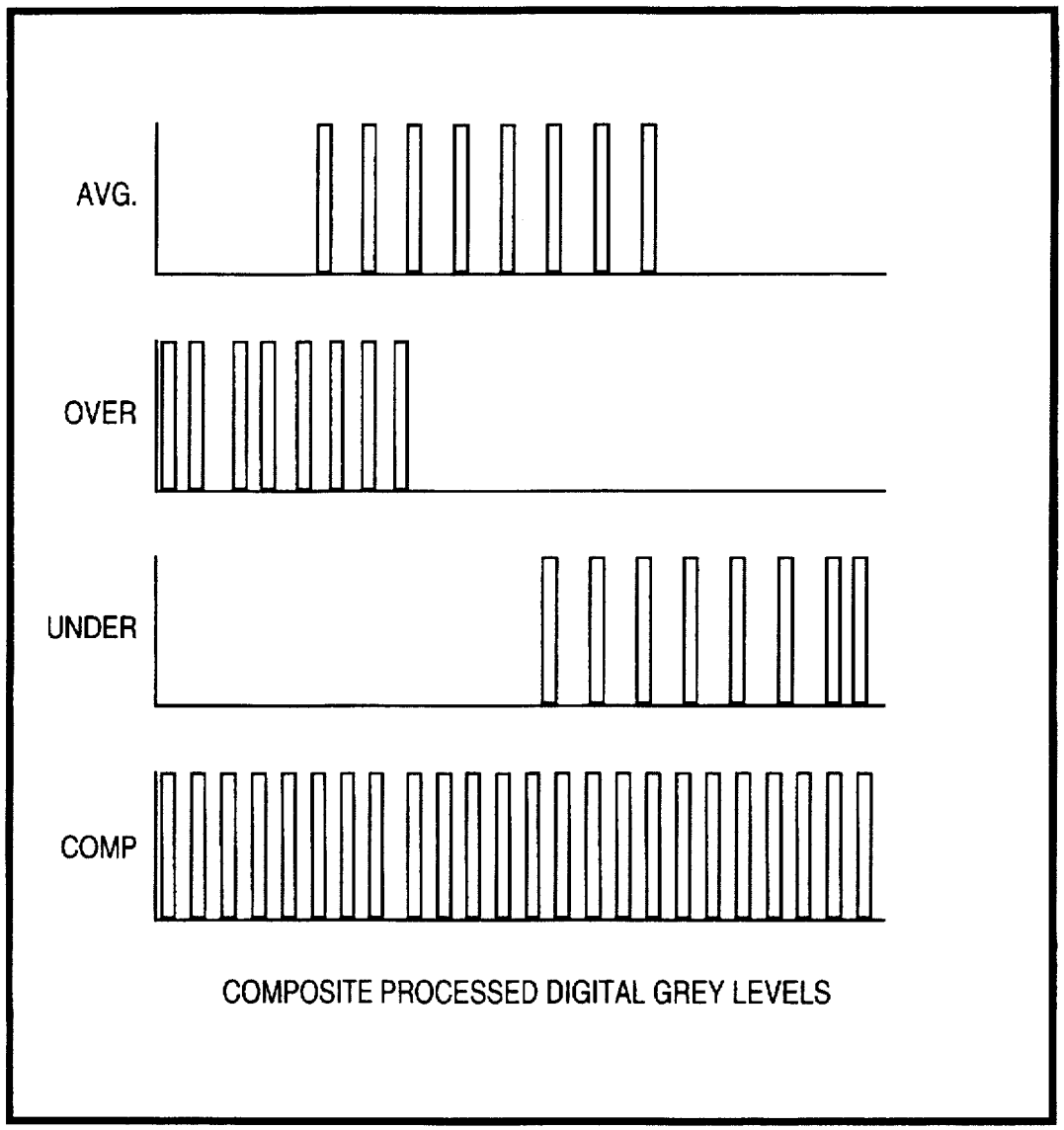
FIG. 6 is a graphic representation of the collated data assembled from the three scans by the present invention.

After the three scans are completed, a software routine within computer 20 selectively extracts data from each of the scans to create a composite, final stored image. Generally, the gray scale levels obtained for the dark areas from the overexposed scan are kept for the composite image, as well as the grays scales obtained for the light areas from the underexposed image. The gray scale levels obtained during the first, normally exposed scan are used for those portions of the picture which tend to be intermediate between the extremely dark portions of the image and the extremely light portions. FIG. 6 is a graphic representation of the image data after the appropriate portions of each scan have been collated and processed. Once this composite stored image is created, it may be used and stored in any known fashion.

Figure 7:
FIG. 7 shows the image of FIG. 2 when it is processed using the present invention.

For comparison purposes, the same image shown is FIG. 2 is shown in FIG. 7, after it has been recaptured by the method taught in the present invention. The improvement in contrast and visual detail is obvious.

The present invention has now been described in detail, in the context of several specific embodiments. Nothing herein should be taken to limit this invention to the particular embodiments discussed. For example, more scans could be performed at different exposure levels, thereby increasing the captured contrast levels in various other portions of the picture. The automatic image processing could be modified to allow user input to vary the mix of the values obtained from the different scans. Given these various possibilities, this invention should not be considered in a narrow restrictive sense, but rather in a broad expansive sense.

What is claimed is:

1. In an image processing system comprising a scanner with multiple exposure levels and a computer means for storing and processing serial binary image data generated by the scanner, a method for improving the quality of the image captured by the scanner, the method comprising the steps of:

scanning an image for a first time with the scanner, the serial binary data generated by the scanner during this first scan being stored in the computer means;

scanning the image for a second time with the scanner, the serial binary data generated by the scanner during this second scan being stored in the computer means;

scanning the image for a third time with the scanner, the serial binary data generated by the scanner during the third scan being stored in the computer means;

selecting from the serial binary data obtained in the third scan a first set of values, said first set of values being all gray scale values above a first predetermined threshold;

selecting from the serial binary data obtained in the second scan a second set of values, said second set of values being all gray scale values below a second predetermined threshold;

selecting from the serial binary data obtained in the first scan a third set of values, said third set of values being all gray scale values between the first and second predetermined thresholds; and storing a composite digital image of the image with serial binary data including said first, second and third sets of values, wherein the serial binary data of the composite digital image includes values originally selected from at least one of the first, second and third scanning steps and wherein for each pixel in said composite digital image, a pixel value is specified by only one of said first, second and third set of values.

2. The method of claim 1 wherein the steps of scanning the image the first, second, and third times may occur in any predetermined order.

3. A method of digital image capture and processing comprising the steps of:

scanning a first image at a first exposure level to create a first set of binary image data;

scanning the first image at a second exposure level to create a second set of binary image data, the second exposure level exceeding the first exposure level by a factor of at least two;

scanning the first image at a third exposure level to create a third set of binary image data, the third exposure level being less than the first exposure level by a factor of at least two;

forming a composite binary image data set based on data from the first binary image data set, data below a predetermined threshold from the second binary image data set, and data above a predetermined threshold from the third binary image data set, wherein data from the composite binary image data set includes data originally scanned from the first image and wherein for each pixel in said composite digital image, a pixel value is specified by only one of said first, second and third set of binary image data; and storing said composite binary image data set.

4. The method of claim 3 wherein the steps of scanning the first image to create the first, second, and third set of binary image data may occur in any predefined order.

5. An apparatus for capturing, storing and displaying images comprising:

first means for capturing a first digital data set of a first image;

second means for capturing a second digital data set of the first image;

third means for capturing a third digital data set of the first image;

means for storing the first, second, and third digital data sets coupled to the first, second, and third means for capturing the digital data sets;

means for selecting a first subset of data from said first digital data set based on a first selection criteria;

means for selecting a second subset of data from said second digital data set based on a second selection criteria, said second selection criteria being different from said first selection criteria;

means for selecting a third subset of data from said third digital data set based on a third selection criteria, said third selection criteria being different from said first and second selection criteria;

means for manipulating the first, second, and third subsets of data to form a composite digital image set, wherein data from the composite digital set includes data originally scanned from the first image and wherein for each pixel in said composite digital image, a pixel value is specified by only one of said first, second and third digital data set, the means for manipulating the subsets of data being coupled to the means for storing the digital data sets; and display means coupled to the means for manipulating the digital data sets for displaying the composite digital image set.

6. The method as described in claim 1 wherein said exposure level is set by varying a light intensity of a light source.

7. The method as described in claim 2 wherein said exposure level is set by varying a light intensity of a light source.

8. The method as described in claim 3 wherein said exposure level is set by varying a light intensity of a light source.

9. The method as described in claim 4 wherein said exposure level is set by varying a light intensity of a light source.

10. The apparatus as described in claim 5 wherein first, second and third means capture said first, second, and third digital data sets at exposure levels that are set by varying a light intensity of a light source.

11. The method as described in claim 1 wherein said scanner is set to an intermediate exposure level during said step of scanning said image for said first time, said scanner is set to an exposure level at least twice as great as that used in the first scan during said step of scanning said image for said second time, and said scanner is set to an exposure level at least two times less than that used in said first scan during said step of scanning said image for said third time.

12. The method as described in claim 2 wherein said scanner is set to an intermediate exposure level during said step of scanning said image for said first time, said scanner is set to an exposure level at least twice as great as that used in the first scan during said step of scanning said image for said second time, and said scanner is set to an exposure level at least two times less than that used in said first scan during said step of scanning said image for said third time.

13. The method as described in claim 6 wherein said scanner is set to an intermediate exposure level during said step of scanning said image for said first time, said scanner is set to an exposure level at least twice as great as that used in the first scan during said step of scanning said image for said second time, and said scanner is set to an exposure level at least two times less than that used in said first scan during said step of scanning said image for said third time.

14. The method as described in claim 7 wherein said scanner is set to an intermediate exposure level during said step of scanning said image for said first time, said scanner is set to an exposure level at least twice as great as that used in the first scan during said step of scanning said image for said second time, and said scanner is set to an exposure level at least two times less than that used in said first scan during said step of scanning said image for said third time.

15. The apparatus as described in claim 5 wherein said first means is set to a first exposure level, said second means is set to a second exposure level at least two times greater than said first exposure level, and said third means is set to a third exposure level at least two times less than the first exposure level.

16. The apparatus as described in claim 10 wherein said first means is set to a first exposure level, said second means is set to a second exposure level at least two times greater than said first exposure level, and said third means is set to a third exposure level at least two times less than the first exposure level.

17. In an image processing system comprising a scanner with multiple exposure levels and a computer means for storing and processing binary image data generated by the scanner, a method for improving the quality of the image captured by the scanner, the method comprising the steps of:

scanning an image for a first time with the scanner, the binary data generated by the scanner during this first scan being stored in the computer means;

scanning the image for a second time with the scanner, the binary data generated by the scanner during this second scan being stored in the computer means;

scanning the image for a third time with the scanner, the binary data generated by the scanner during the third scan being stored in the computer means;

selecting from the binary data obtained in the third scan a first set of values, said first set of values being all gray scale values above a first predetermined threshold;

selecting from the binary data obtained in the second scan a second set of values, said second set of values being all gray scale values below a second predetermined threshold; selecting from the binary data obtained in the first scan a third set of values, said third set of values being all gray scale values between the first and second predetermined thresholds; and storing a composite digital image of the image with binary data including said first, second and third sets of values, wherein the binary data of the composite digital image includes values originally selected from at least one of the first, second and third scanning steps and wherein for each pixel in said composite digital image, a pixel value is specified by only one of said first, second and third set of values.

18. The method of claim 17 wherein the steps of scanning the image the first, second, and third times may occur in any predetermined order.

* * * * *